Feb. 25, 1969  R. W. STORMFELTZ  3,429,766
CLUTCH FACING
Filed Oct. 21, 1965
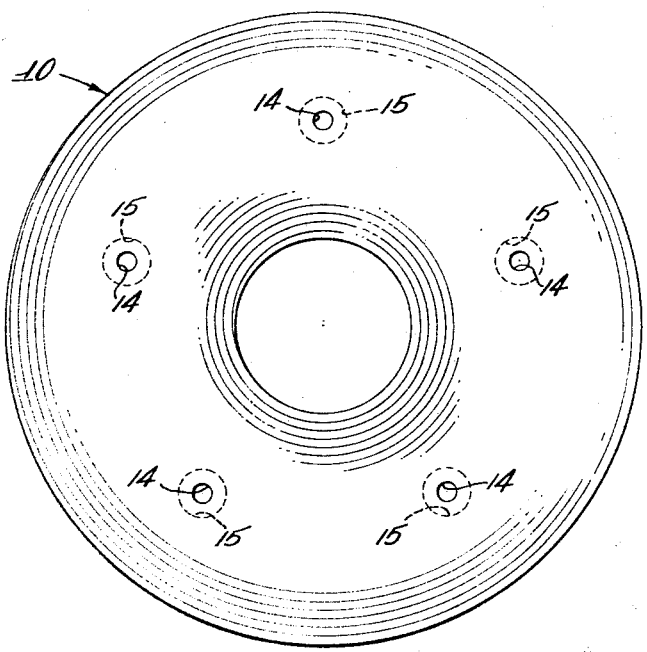
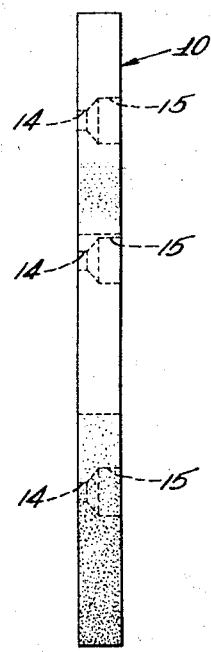
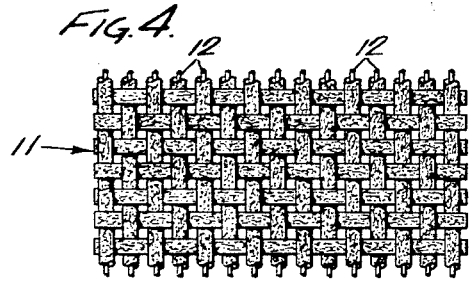
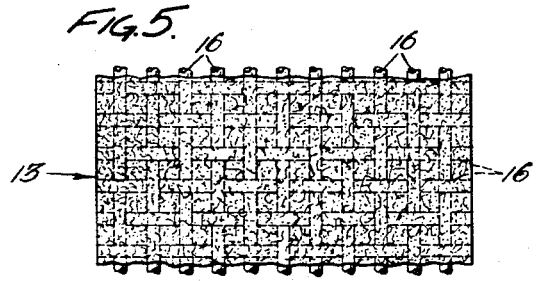
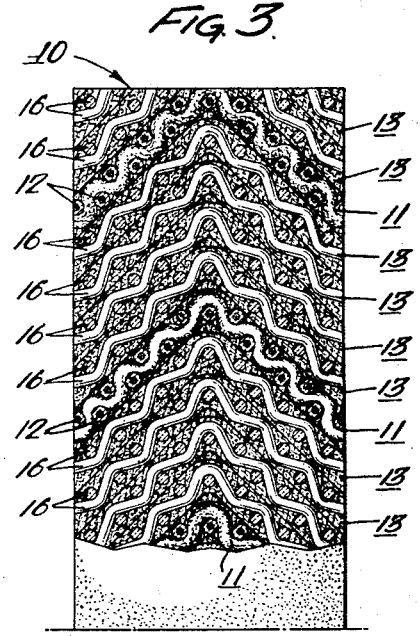
INVENTOR:
ROBERT W. STORMFELTZ
BY Howson & Howson
ATTYS.

3,429,766
CLUTCH FACING
Robert W. Stormfeltz, Manheim, Pa., assignor to Raybestos-Manhattan, Inc., Manheim, Pa., a corporation of New Jersey
Filed Oct. 21, 1965, Ser. No. 499,328
U.S. Cl. 161—35       8 Claims
Int. Cl. F16d 69/02

ABSTRACT OF THE DISCLOSURE

A clutch facing comprising a cured resin impregnated spirally wound strip including a woven reinforced strand fabric and plies of dry carded asbestos fiber material reinforced by an open mesh woven glass fabric.

---

This invention relates to clutch facings of novel structure, and more particularly to clutch facings of composite structure or to reinforcement of endless friction facings generally formed of a strip of material wound in spiral fashion to form a coiled annulus.

It has, heretofore, been proposed to strengthen clutch facings of the class described against disruption by centrifugal force by bonding to one face a coextensive metal sheet or fibrous backing layer or sheet formed of felted or woven material. A particular disadvantage of such use of a metal sheet is high inertia, requiring greater power to rotate the clutch assembly. Other disadvantages of a metal reinforcing sheet are the difficulty of obtaining a substantially flat sheet which will meet clutch assembly dimensional tolerances, and increased costs. Although clutch facings reinforced by a fibrous backing layer or sheet, as disclosed for example in United States Patent No. 2,640,795, are relatively inexpensive to produce, and have increased bursting strength, nevertheless, the increase in bursting strength provided by the backing layer may not be sufficient to cope with the very high rotative speeds clutch facings are subjected to in today's motor vehicles.

It is an object of this invention to provide novel reinforced clutch facings of the class described which can be produced relatively inexpensively, yet have the substantially increased bursting strength required of today's motor vehicles. The novel clutch facings according to this invention comprise an annular body formed of a spirally wound multi-ply strip having at least one ply comprising a woven fabric having metallic wires associated with at least some of the strands thereof, and a plurality of plies of thin, flexible, consolidated and condensed, dry carded spinning grade asbestos web material of relatively high porosity, the fibers being interlocked with each other, said strip being impregnated with a cement composition comprising heat-hardenable resin and friction material filler, said facing being compressed to consolidate the convolutions upon each other and heat treated to harden said cement composition.

Preferably, the asbestos fiber web material comprising the reinforcing element is reinforced by an open mesh woven glass fabric.

Other objects and advantages of this invention will be apparent from the accompanying drawings and following detailed description.

In the drawings, FIG. 1 is a plan view of a reinforced clutch facing, in accordance with the present invention.

FIG. 2 is an end elevation of a clutch facing of this invention.

FIG. 3 is a fragmentary enlarged end elevation of the clutch facing of FIG. 2 with a part broken away to show the construction.

FIG. 4 is an enlarged detail of a preferred form of woven asbestos fabric which may be employed in the clutch facings of this invention.

FIG. 5 is an enlarged detail of a preferred form of asbestos web material comprising the reinforcing element of the clutch facings of this invention.

Referring to the drawings, and particularly to FIGS. 1 and 3, the reference numeral 10 indicates a clutch facing according to this invention which comprises a coiled multiply strip having at least one ply 11 comprising a woven fabric having metallic wires 12 associated with at least some of the strands thereof, and a plurality of reinforcing plies 13 of thin, flexible, consolidated and condensed dry carded spinning grade asbestos fiber web material. In FIG. 3, the plies 13 are shown reinforced with a woven glass cloth 16, more fully described hereinafter. The various plies are bonded together by a cement composition comprising heat-hardenable resin and friction material filler.

In FIG. 3, the plies 11 and 13 are shown folded longitudinally into chevron form in cross section, with the adjacent convolutions in interesting relationship as described in Cilley United States Patent No. 2,096,692. Although not shown, it will be understood that the respective plies may be longitudinally shaped to provide other deformed cross sections, such as, for example a W-shape, or an arcuate shape. As a further alternative, the clutch facing of this invention may be formed of strips or plies which are substantially flat.

The clutch facings are provided with rivet holes 14 having counterbores 15, for example by drilling, for reception of attaching rivets for securing the facings to a suitable clutch plate, not shown.

In preparing the material for the plies 11, the yarns can be made of asbestos fibers alone or mixtures with other fibers such as cotton, wool, rayon, linen or jute. In weaving the fabric forming the plies 11, reinforcing threads or strands of any of the above fibrous materials may be used.

Preferably the yarns are of asbestos fibers, or mixtures of asbestos fibers and other fibers such as cotton fibers and are reinforced with fine metal wires of brass, copper, zinc, lead, or other metal. This preferred form of woven fabric is illustrated in FIGS. 3 and 4 where the fabric of plies 11 comprises asbestos warp threads and asbestos weft threads, the former being reinforced with brass wires 12. Although only the warp threads are shown as being reinforced with wires 12, the weft threads may also be so reinforced.

An example of a fabric particularly useful for preparing plies 11 is formed of warp and weft yarns comprising a mixture of about 75% by weight of spinning grade asbestos fibers and 25% by weight of organic fibers, such as cotton fibers, reinforced with brass wire approximately 0.008″ in diameter.

The woven fabric sheet is then impregnated with a cement composition comprising heat-hardenable resin and friction material filler, and plied up with plies 13.

The cement composition with which the fabric comprising piles 11 are impregnated comprises a heat-hardenable or thermosetting resin, particularly the phenolic type, such as the phenol aldehydes, and especially phenol formaldehyde which, if desired, may be of the oil-modified type.

Preferably the cement composition contains rubber in addition to heat-hardenable resin. The rubber constituent of the cement may be either natural rubber or a synthetic rubber such as polychloroprene, butadiene-styrene copolymer, butadiene-acrylonitrile copolymer, the more recently developed hydrocarbon rubbers such as those comprising a copolymer of ethylene, propylene and a third monomer, such as dicyclopentadiene, which provides unsaturation for curing, and the like. A rubber-containing cement, of course, will also include well known vulcanizing and stabilizing agents for rubber.

The cement composition also contains a conventional friction material filler. Such fillers ordinarily will comprise inorganic materials such as litharge and barytes, or an organic filler, such as particles formed of polymerized cashew nut oil.

Typical cement compositions particularly suitable for impregnating the plies 11 and 13 of the clutch facings of this invention are as follows, the proportions given being in parts by weight:

| | |
|---|---|
| Rubber (butadiene-styrene copolymer) | 5–15 |
| Rubber accelerator | .05–5 |
| Sulfur | 1–12 |
| Barytes | 30–50 |
| Litharge | 10–40 |
| Graphite | 0.5–10 |
| Phenol formaldehyde resin | 5–15 |

Preferably, the cement composition will contain from about 25% to about 75% rubber solids and from about 75% to about 25% of heat-hardenable resin solids, based on the combined weight of the two.

The woven fabric from which the strips comprising the plies 11 are made may be impregnated with cement by passing the web through a solution of the cement and removing excess by any suitable means, such as squeeze rolls. The fabric is heated to a temperature at which solvent is removed but below that required for curing the resin.

The impregnated fabric after being plied up with plies 13 may then be convolutely wound to a roll of the desired diameter and cut into coiled annuli of any width depending upon the desired width of the finished clutch facing.

Reinforcing plies 13 are formed of thin, flexible, consolidated and condensed dry carded spinning grade asbestos fiber web material. Such a web may be produced by carding a mixture of spinning grade asbestos fibers in a manner well known in the textile art. Asbestos fibers which are suitable for such use are chrysotile, crocidolite or amosite. The length of the asbestos fibers employed may range from about ⅛" to 1½" or larger, the preferred average length being about ⅜".

Although there is some orientation of the fibers longitudinally of the web due to the carding action, there is predominately a random disposition of the fibers in the web, and this random disposition plays an important part in the intimate interlocking of the asbestos fibers with one another.

Referring to FIGS. 3 and 5 of the drawings, in which is illustrated a particularly preferred embodiment of the invention, the strips of dry carded spinning grade asbestos fiber web material forming the reinforcing plies is further reinforced by an open mesh woven glass cloth or fabric 16. Such reinforcement may be accomplished by bringing the dry carded asbestos web and the glass cloth together and passing them between a pair of rolls whereby the composite assembly is compressed, and the dry carded asbestos fibers are caused to fill the meshes of the glass cloth and to interlock with one another and with the yarns of the glass fabric. Preferably, the glass fabric has a web of dry carded asbestos fibers applied to each side and the asbestos fibers of the respective webs and yarns of the glass fabric are interlocked by passing the assembly between pressure rolls as described above. The reinforced web material ordinarily will range between about 0.010" and 0.015" in thickness.

The dry carded spinning grade asbestos fiber webs may be formed entirely of asbestos fibers or mixtures of asbestos fibers with carrier fibers such as rayon, cotton, nylon, Dacron, Orlon, etc. Both natural and synthetic type carrier fibers may be used. The length of such carrier fibers may be as stated above with reference to the asbestos fibers. A particularly useful fiber mixture is one comprising 75%, by weight, of spinning grade asbestos fibers and 25% of carrier fibers such as cotton fibers.

Glass cloth formed from various sizes of glass yarns may be used for the purpose of this invention. Some examples of the yarn sizes are size 150 of which there are 15,000 yards to the pound, size 225 of which there are 22,500 yards to the pound, and size 450 of which there are 45,000 yards to the pound. A preferred glass cloth is that formed from size 150 yarn.

A glass cloth construction of 20 yarns per inch in both warp and fill is particularly satisfactory. However, glass cloth employing a greater number of yarns per inch in both warp and fill can be used, provided that there is sufficient mesh area for the asbestos fibers to interlock through the meshes of the glass cloth. Composite fabrics can be made according to this invention with various weaves of glass cloth.

Glass fabric reinforced dry carded asbestos fibers which may be used to advantage in this invention are disclosed in U.S. Patent No. 2,943,010 issued to E. P. Stefl et al. on June 28, 1960.

If desired the dry carded asbestos web material, whether reinforced by glass fabric or not, can be subjected to a sizing operation by immersing the material in a dilute solution of a sizing agent such as starch. The sizing operation is preferably so controlled as to incorporate from about 1% to about 2% by weight of sizing solids in the web, and to thereby leave the web in a porous condition such that it can be readily impregnated with a cement composition.

The dry carded asbestos web material is impregnated with a cement composition such as that used to impregnate the plies 11. Preferably, the plies 11 and 13 comprise from about 40% to about 75% of cement composition solids, based on the combined weight of such solids and web material.

The dry carded asbestos web material forming the reinforcing plies 13 may be impregnated with cement composition in the same manner as described in connection with the woven fabric for use as plies 11.

The dried impregnated sheets of woven fabric comprising plies 11 are combined with dried impregnated sheets of dry carded asbestos fiber web material comprising reinforcing plies 13 so that there are at least four plies of the latter for each of the former. Where the piles 13 are reinforced with woven glass cloth fewer of such plies are needed to obtain a given bursting strength. There may be as many as a dozen or more reinforcing plies 13 for each ply 11, particularly where the plies 13 are not reinforced with glass fabric.

The sheet resulting from combining plies 11 and 13 is then wound convolutely to the desired diameter and cut into convolute annuli of the desired thickness.

Each coiled annulus is subjected to heat and pressure by suitable means, such as, for example, in a mold to densify the facing, and cause the cement composition to flow and permeate and to consolidate the windings, and to heat harden or cure the resin binder, and rubber if present. Subsequently, the resulting clutch facing is subjected to a finishing operation, as for example surface grinding. The rivet holes 12 may be formed during the molding operation or formed subsequently by drilling and counterboring.

The thickness of the clutch facing of this invention can be varied within limits by correspondingly varying the thickness of the coiled annuli formed of plies 11 and 13 prior to pressing.

What is claimed is:

1. A clutch facing comprising an annular body formed of a spirally wound multi-ply strip having at least one ply comprising a woven fabric having metallic wires associated with at least some of the strands thereof, and a plurality of plies of thin, flexible, consolidated and condensed dry carded spinning grade asbestos fiber web material of relatively high porosity reinforced by an open mesh woven glass fabric, the fibers being interlocked with each other and with the yarns of said glass fabric and filling the meshes thereof, said strip being impregnated with a cement composition comprising heat-hardenable resin and friction material filler, said facing being compressed to consolidate the convolutions upon each other and heat treated to harden said cement composition.

2. A clutch facing according to claim 1 in which said ply of woven fabric comprises asbestos fibers.

3. A clutch facing according to claim 1 in which said annular body comprises from about 40% to about 75% by weight of cement composition solids.

4. A clutch facing according to claim 3 in which said cement composition comprises from about 25% to about 75% of rubber solids and from about 75% to about 25% of heat-hardenable resin solids.

5. A clutch facing comprising an annular body formed of a spirally wound multi-ply strip having at least one ply comprising a woven fabric having metallic wires associated with at least some of the strands thereof, and a plurality of plies of thin, flexible, consolidated and condensed dry carded spinning grade asbestos fiber web material of relatively high porosity reinforced by an open mesh woven glass fabric, the fibers being interlocked with each other and with the yarns of said glass fabric and filling the meshes thereof, said strip being impregnated with a cement composition comprising heat-hardenable resin and friction material filler, said strip being longitudinally folded to provide a symmetrical cross-sectional form and the convolutions thereof being in internesting relationship, said facing being compressed to consolidate the convolutions upon each other and heat treated to harden the binder.

6. A clutch facing according to claim 5 in which said annular body comprises from about 40% to about 75% by weight of cement composition solids.

7. A clutch facing according to claim 6 in which said cement composition comprises from about 25% to about 75% of rubber solids and from about 75% to about 25% of heat-hardenable resin solids.

8. A clutch facing according to claim 7 in which said ply of woven fabric comprises asbestos fibers.

References Cited

UNITED STATES PATENTS

| | | | |
|---|---|---|---|
| 2,640,795 | 6/1953 | Bertolet | 156—201 XR |
| 2,702,770 | 2/1955 | Steck | 156—184 XR |
| 2,943,010 | 6/1960 | Stefl et al. | 161—181 XR |
| 3,068,131 | 12/1962 | Morton | 161—42 |

ROBERT F. BURNETT, *Primary Examiner.*

WILLIAM A. POWELL, *Assistant Examiner.*

U.S. Cl. X.R.

161—42, 93, 96, 155, 156, 205; 156—169, 227; 192—107